United States Patent
Nelson et al.

(10) Patent No.: US 10,493,938 B1
(45) Date of Patent: Dec. 3, 2019

(54) REAL-TIME VEHICLE ENVIRONMENT RECOGNITION AND COLLISION IDENTIFICATION SYSTEM

(71) Applicant: BANK OF AMERICA CORPORATION, Charlotte, NC (US)

(72) Inventors: Mark Allan Nelson, Waxhaw, NC (US); Ashish B. Tajpuria, San Francisco, CA (US); Karen Lea MacQueen, Lyndhurst, OH (US); Stephen Philip Selfridge, Huntersville, NC (US); Steven Michael Twombly, Saco, ME (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 15/986,551

(22) Filed: May 22, 2018

(51) Int. Cl.
| | |
|---|---|
| *G06Q 20/08* | (2012.01) |
| *B60R 21/0136* | (2006.01) |
| *G07C 5/00* | (2006.01) |
| *G06Q 40/08* | (2012.01) |
| *G06Q 50/30* | (2012.01) |
| *H04W 4/40* | (2018.01) |
| *B60R 21/00* | (2006.01) |

(52) U.S. Cl.
CPC ......... *B60R 21/0136* (2013.01); *G06Q 40/08* (2013.01); *G06Q 50/30* (2013.01); *G07C 5/008* (2013.01); *H04W 4/40* (2018.02); *B60R 2021/0027* (2013.01)

(58) Field of Classification Search
CPC ....... B60R 21/0136; B60R 2021/0027; H04W 4/40; G06Q 40/08; G06Q 50/30; G07C 5/008

USPC .......................................................... 340/436
See application file for complete search history.

(56) References Cited

U.S. PATENT DOCUMENTS

| | | | |
|---|---|---|---|
| 3,760,898 A * | 9/1973 | Kendall | B60R 25/042 180/287 |
| 6,490,513 B1 | 12/2002 | Fish et al. | |
| 6,526,335 B1 | 2/2003 | Treyz et al. | |
| 6,853,894 B1 | 2/2005 | Kolls | |

(Continued)

OTHER PUBLICATIONS http://www.techradar.com/news/meet-the-car-key-thats-also-a-contactless-payment-card Retrieved on May 30, 2018.

(Continued)

*Primary Examiner* — Brent Swarthout
(74) *Attorney, Agent, or Firm* — Michael A. Springs; Moore & Van Allen PLLC; Nicholas C. Russell (57) ABSTRACT

Embodiments of the present invention provide a system for recognizing environment of a vehicle and identifying collisions in real-time. The system is typically configured for continuously monitoring environment of an automobile via one or more components of the automobile, identifying at least one collision associated with the automobile based on monitoring the environment of the automobile, determining one or more users associated with the at least one collision, determining one or more third parties associated with the one or more users and the at least one collision, automatically establish a communication link with the one or more third party entities, and automatically transmitting a notification associated with the at least one collision to the one or more third party entities and the one or more users in real-time.

20 Claims, 6 Drawing Sheets

(56) References Cited

U.S. PATENT DOCUMENTS

| | | | |
|---|---|---|---|
| 7,520,440 B2 | 4/2009 | Ortigosa Vallejo et al. | |
| 7,742,941 B2 | 6/2010 | Yamauchi | |
| 8,751,391 B2 | 6/2014 | Freund | |
| 8,799,034 B1 * | 8/2014 | Brandmaier | G07C 5/008 |
| | | | 705/4 |
| 9,471,915 B2 | 10/2016 | Fuerstenberg et al. | |
| 9,508,068 B2 | 11/2016 | Mastrangelo et al. | |
| 9,792,656 B1 * | 10/2017 | Konrardy | H04W 4/90 |
| 9,801,000 B2 | 10/2017 | Shao | |
| 10,032,226 B1 * | 7/2018 | Suizzo | G06Q 40/08 |
| 2002/0177926 A1 * | 11/2002 | Lockwood | G06Q 10/20 |
| | | | 701/1 |
| 2005/0071202 A1 | 3/2005 | Kendrick | |
| 2007/0008183 A1 | 1/2007 | Levi | |
| 2007/0135979 A1 | 6/2007 | Plante | |
| 2007/0135980 A1 | 6/2007 | Plante | |
| 2007/0136078 A1 | 6/2007 | Plante | |
| 2010/0004818 A1 | 1/2010 | Phelan | |
| 2010/0087986 A1 | 4/2010 | Lal et al. | |
| 2010/0123564 A1 | 5/2010 | Grunhold | |
| 2010/0131304 A1 | 5/2010 | Collopy et al. | |
| 2012/0295592 A1 | 11/2012 | Peirce | |
| 2013/0211623 A1 | 8/2013 | Thompson et al. | |
| 2013/0212659 A1 | 8/2013 | Maher et al. | |
| 2014/0279707 A1 | 9/2014 | Joshua et al. | |
| 2015/0120083 A1 | 4/2015 | Gurovich et al. | |
| 2017/0372294 A1 | 12/2017 | Pelletier | |
| 2018/0025348 A1 | 1/2018 | Shauh et al. | |

OTHER PUBLICATIONS https://usa.visa.com/visa-everywhere/innovation/visa-connected-car.html Retrieved on May 30, 2018.

http://lisnr.com/resources/blog/in-car-contactless-payments-the-next-generation-of-mobile-commerce/ Retrieved on May 30, 2018.

* cited by examiner

REAL-TIME VEHICLE ENVIRONMENT RECOGNITION AND COLLISION IDENTIFICATION SYSTEM

FIELD OF THE INVENTION

The present invention relates to a system for recognizing vehicle environment and identifying collision associated with the vehicle.

BACKGROUND

Interactions between third party entities associated with users involved in a collision is often a slow and inefficient process. Typically, the third party entities investigate based on statements received from the users. In some cases, the third party entities may not be able to determine a cause of the collision, thereby delaying the process completing the interactions. As such, there exists a need for a system to improve the efficiency of completing the interactions.

SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Embodiments of the present invention address the above needs and/or achieve other advantages by providing apparatuses (e.g., a system, computer program product and/or other devices) and methods for recognizing vehicle environment and identifying collisions. The invention continuously monitors environment of an automobile via one or more components of the automobile, identifies at least one collision associated with the automobile based on monitoring the environment of the automobile, determines one or more users associated with the at least one collision, determines one or more third parties associated with the one or more users and the at least one collision, automatically establishes a communication link with the one or more third party entities, and automatically transmits a notification associated with the at least one collision to the one or more third party entities and the one or more users in real-time.

In some embodiments, the present invention continuously stores information determined by the one or more components of the automobile.

In some embodiments, the present invention in response to identifying at least one collision, retrieves the information determined by the one or more components during a time period associated with the at least one collision, determines cause of the at least one collision based on the retrieved information associated with the one or more components, generates a claim for the at least one collision, wherein the claim comprises the cause of the at least one collision, and transmits the claim to the one or more third party entities in real-time.

In some embodiments, the present invention in response to transmitting the claim to the one or more third party entities, automatically transfers resources from a resource pool of a user of the automobile to at least one other resource pool of the one or more third party entities based on the determined cause of the at least one collision.

In some embodiments, the one or more components comprise at least one of one or more sensors, one or more lasers, one or more cameras, and speed monitoring systems.

In some embodiments, the acceleration of the automobile is greater than zero.

In some embodiments, the acceleration of the automobile is equal to zero.

In some embodiments, the automobile is an autonomous automobile.

In some embodiments, the one or more third party entities comprise at least one of authorities, emergency responders, and insurance entities, In some embodiments, the present invention in response to determining the at least one collision, automatically controls at least one of the one or more components of the automobile.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will be made to the accompanying drawings, where:

DETAILED DESCRIPTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, a "financial institution" as used herein may include commercial banks, thrifts, federal and state savings banks, savings and loan associations, credit unions, investment companies, insurance companies and the like. In some embodiments, the financial institution may allow a customer to establish an account with the financial institution. An "account" or "resource pool" may be the relationship that the customer has with the financial institution. Examples of accounts include a deposit account, such as a transactional account (e.g. a banking account), a savings account, an investment account, a money market account, a time deposit, a demand deposit, a pre-paid account, a credit account, a non-monetary customer profile that includes only personal information associated with the customer, or the like. An account may be associated with and/or maintained by a financial institution.

An entity may be any person or organization. In some embodiments, the term "third party entity" as used herein may be insurance companies, emergency responders, authorities, and or the like. The third party entity may be any entity which is involved in providing services or offering assistance associated vehicle collisions.

In some embodiments, a "user" may be an insurance company customer, financial institution customer (e.g., an account holder or a person who has an account (e.g., banking account, credit account, or the like)). In some embodiments, a "user" may be a customer of a third party entity. In one embodiment, the user may be a driver of the vehicle, customer of a financial institution, or a customer of a third party entity. In one embodiment of the present invention, one or more users may include any person involved in a collision with a vehicle of the customer of the financial institution or the insurance company.

In accordance with embodiments of the invention, an "interaction" may be a transaction, transfer of funds, transfer of resources, and may refer to any activities or communication between a user and a financial institution, between a financial institution and a third party system, activities or communication between multiple financial institutions, communication between technology application and the like. Transfer of resources may refer to a payment, processing of funds, international transfer of funds, purchase of goods or services, a return of goods or services, a payment transaction, a credit transaction, or other interactions involving user's resource or account. Unless specifically limited by the context, a "transaction", a "transfer of funds", a "record" may refer to any activity initiated between a user and a financial institution or a third party system, or any combination thereof. Typical financial transactions include point of sale (POS) transactions, automated teller machine (ATM) transactions, person to person (p2p) transfers, internet transactions, online shopping, electronic funds transfers between accounts, transactions with a financial institution teller, personal electronic checks, conducting purchases using loyalty/reward points etc. When discussing the resource transfers or transactions are evaluated it could mean that the transactions have already occurred, are in the process of occurring or being processed, or they have yet to be processed/posted by one or more financial institutions. In one embodiment of the present invention, the interaction may be a transfer of resources associated with settlement of an insurance claim between two insurance companies whose users are involved in a collision.

A "system environment", as used herein, may refer to any information technology platform of an enterprise (e.g., a national or multi-national corporation) and may include a multitude of servers, machines, mainframes, personal computers, network devices, front and back end systems, database system and/or the like.

Figure 1:
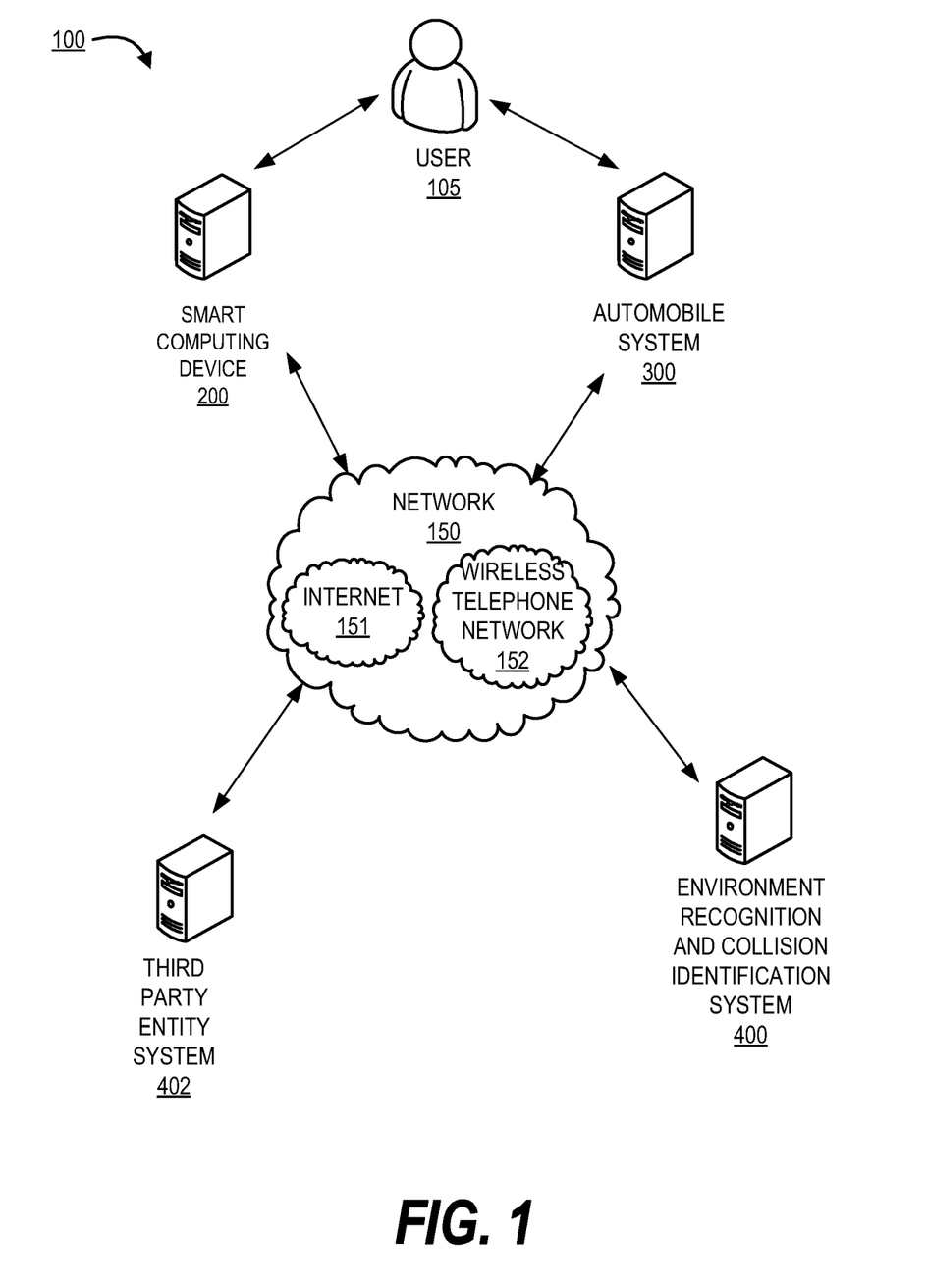
FIG. 1 presents an automobile environment recognition and collision identification system environment, in accordance with an embodiment of the present invention.

FIG. 1 provides a block diagram illustrating an environment 100 an automobile environment recognition and collision identification system. As depicted in FIG. 1, the operating environment 100 may include an environment recognition and collision identification system 400 interacting with a smart computing device 200 and automobile system 300 of a user 105, one or more third party entity systems 402, using a network 150 that includes an internet 151 and wireless telephone network 152. In some embodiments, the environment recognition and collision identification system 400 may be owned by a financial institution and maintained by a third party entity. In some embodiments, the environment recognition and collision identification system 400 may be owned and maintained by the financial institution. In such an embodiment, the environment recognition and collision identification system 400 communicates with a financial institution system to complete one or more interactions. In some embodiments, the environment recognition and collision identification system 400 may be a part of an financial institution system (not shown) or a system operated by another entity. In alternate embodiments, the environment recognition and collision identification system 400 may be a part of the automobile system 300. In some embodiments, the environment recognition and collision identification system 400 may be part of a smart chip which is placed in the automobile system 300. In some embodiments, the environment recognition and collision identification system 400 may interact with smart computing devices and automobiles associated with a plurality of users (not shown) at any given instance. The user 105 and other plurality of users may be customers of the financial institution or the third party entities.

The environment 100 also may include a plurality of computing devices of the user 105. The computing devices may include any machine, apparatus, system or the like that may be connected to and communicate with other devices over a network 150. The smart computing device 200 may include a personal computer such as a desktop computer, laptop computer, tablet or any type of personal computing device that may be connected to a network by landline or wireless access such as wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology.

Figure 2:
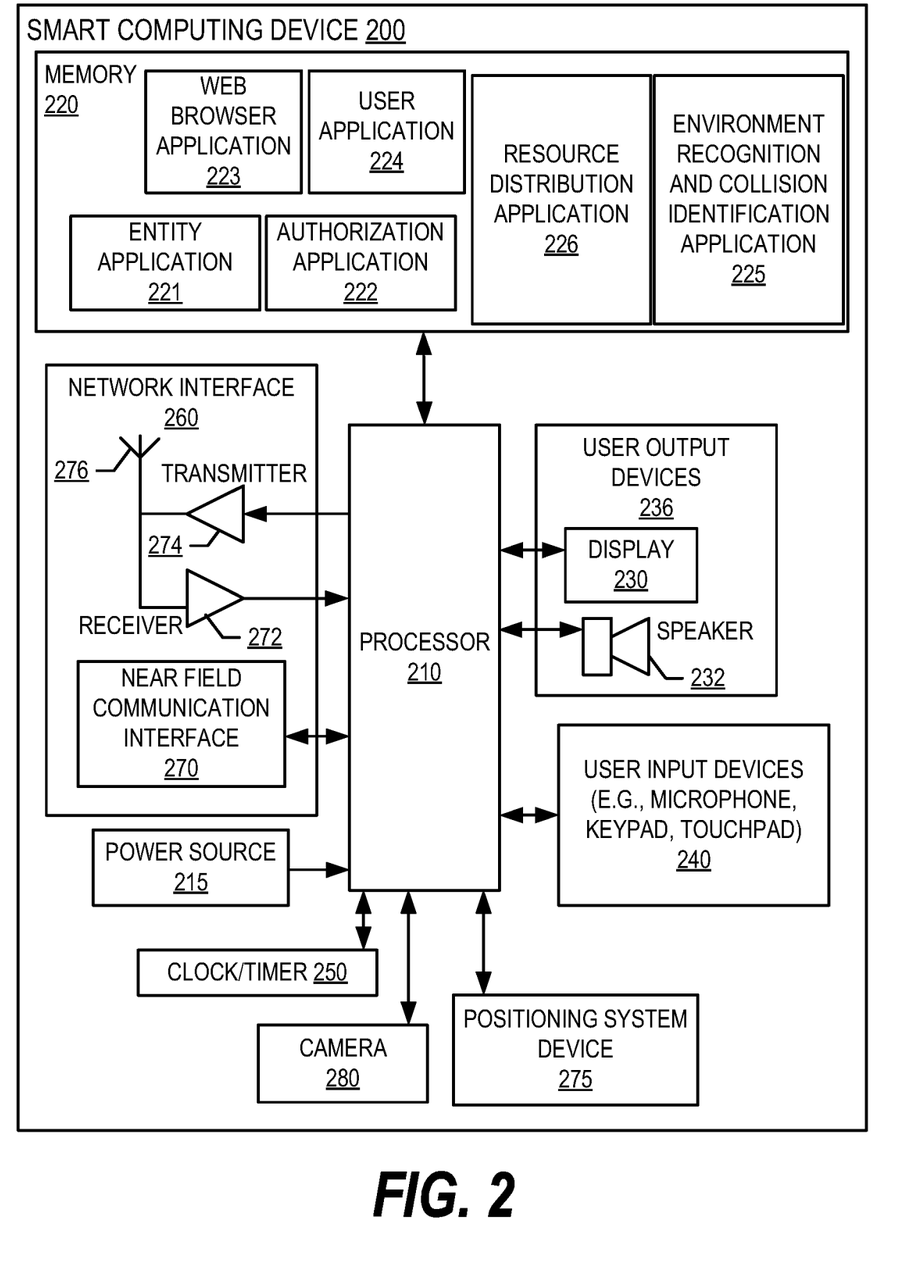
FIG. 2 presents a block diagram illustrating a smart computing device, in accordance with an embodiment of the present invention.

Referring now to FIG. 2, the smart computing device 200 may be any computing device utilized by the user 105. In embodiments of the present invention, the smart computing device may be any device of the user connected to the automobile of the user via a wired (e.g., USB port) or wireless technology (e.g., Bluetooth). The smart computing device may be any wearable device, laptop, mobile device, smart phone device, PDA, tablet, or any other mobile device. In one embodiment of the invention, there may be multiple smart computing devices, wherein the multiple smart computing devices may be a mobile telephone and a smart watch. Other types of smart computing devices 200 may include portable digital assistants (PDAs), pagers, tablets, mobile televisions, gaming devices, laptop computers, cameras, video recorders, audio/video player, radio, Global Positioning Systems (GPS) devices, or any combination of the aforementioned. In one embodiment of the present invention, the smart computing device 200 is a mobile device.

In some embodiments, the smart computing device 200 includes a processor 210 communicably coupled to such devices as a memory 220, user output devices 236, user input devices 240, and a network interface 260. The smart computing device 200 further includes a power source 215, such as a battery, for powering various circuits and other devices that are used to operate the smart computing device 200. Embodiments of the smart computing device 200 may also include a clock or other timer 250 configured to determine and, in some cases, communicate actual or relative time to the processor 210 or one or more other devices. The processor 210, and other processing devices described herein, generally include circuitry for implementing communication and/or logic functions of the associated device. For example, the processor 210 may include a digital signal processor device, a microprocessor device, and various analog to digital converters, digital to analog converters, and/or other support circuits. Control and signal processing functions of the smart computing device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 223. The web browser application 223 may then allow the smart computing device 200 to transmit and receive web content, such as, for example, location-based content and/or other web page content, according to a Wireless Application Protocol (WAP), Hypertext Transfer Protocol (HTTP), and/or the like. The memory device 220 may include other applications such as financial institution application 221, a user application 224, environment recognition and collision identification application 225, resource distribution application 226, authorization application 222, and/or the like. The user application 224 may be a digital wallet application or any application that maintains virtual cards which is provided by the financial institution system. In some embodiments, the resource distribution application 226 may be a part of the financial institution application 221. In some embodiments, financial institution application 221 may be a mobile banking application. The environment recognition and collision identification application 225 interacts with the environment recognition and collision identification system 400 to perform one or more functions. In some embodiments, the authorization application 222 allows the smart computing device 200 to interact with financial institution systems and environment recognition and collision identification system 400.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the smart computing device 200 may be configured to operate with one or more air interface standards, communication protocols, modulation types, and access types. By way of illustration, the smart computing device 200 may be configured to operate in accordance with any of a number of first, second, third, and/or fourth-generation communication protocols and/or the like. For example, the smart computing device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The smart computing device 200 may also be configured to operate in accordance with non-cellular communication mechanisms, such as via a wireless local area network (WLAN) or other communication/data networks.

The network interface 260 may also include a near field communication (NFC) interface 270. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 270 may include a smart card, key card, proximity card, Bluetooth® device, radio frequency identification (RFID) tag and/or reader, transmitter, receiver, and/or the like. In some embodiments, the NFC interface 270 communicates information via radio, infrared (IR), and/or optical transmissions. In some embodiments, the NFC interface 270 is configured to operate as an NFC transmitter and/or as an NFC receiver (e.g., an NFC reader). Also, it will be understood that the NFC interface 270 may be embedded, built, carried, and/or otherwise supported in and/or on the smart computing device 200. In some embodiments, the NFC interface 270 is not supported in and/or on the smart computing device 200, but the NFC interface 270 is otherwise operatively connected to the smart computing device 200 (e.g., where the NFC interface 270 is a peripheral device plugged into the smart computing device 200). Other apparatuses having NFC interfaces mentioned herein may be configured similarly. In some embodiments, the NFC interface 270 of the smart computing device 200 is configured to contactlessly and/or wirelessly communicate information to and/or from a corresponding NFC interface of another apparatus (e.g., a point of sale (POS) device, an automated teller machine (ATM) or another mobile or computing device). In one embodiment of the present invention, the NFC interface of the smart computing device 200 wirelessly communicates information (virtual card information such as virtual card number, CVV code, expiration date) stored in the user application 224 to perform a transaction.

As described above, the smart computing device 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the smart computing device 200 to transmit data, may include any of a number of devices allowing the smart computing device 200 to transmit data, such as a keypad, keyboard, touch-screen, touchpad, microphone, mouse, joystick, other pointer device, button, soft key, and/or other input device(s). The user interface may also include a camera 280, such as a digital camera.

The smart computing device 200 may also include a positioning system device 275 that is configured to be used by a positioning system to determine a location of the smart computing device 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the smart computing device 200. In other embodiments, the positioning system device 275 includes a proximity sensor or transmitter, such as an RFID tag, that can sense or be sensed by devices known to be located proximate a location to determine that the smart computing device 200 is located proximate these known devices.

The memory 220 is operatively coupled to the processor 210. As used herein, "memory" or "memory device" includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like. The memory 220 can store any of a number of applications which include computer-executable instructions/code executed by the processor 210 to implement the functions of the smart computing device 200 and/or one or more of the process/method steps described herein.

These applications also typically provide a graphical user interface (GUI) on the display 230 that allows the user 105 to communicate with the smart computing device 200, a financial institution system and/or other devices or systems. The memory 220 can also store any of a number of pieces of information, and data, used by the smart computing device 200 and the applications and devices that make up the smart computing device 200 or are in communication with the smart computing device 200 to implement the functions of the smart computing device 200 and/or the other systems described herein. For example, the memory 220 may include such data as user authentication information.

Figure 3:
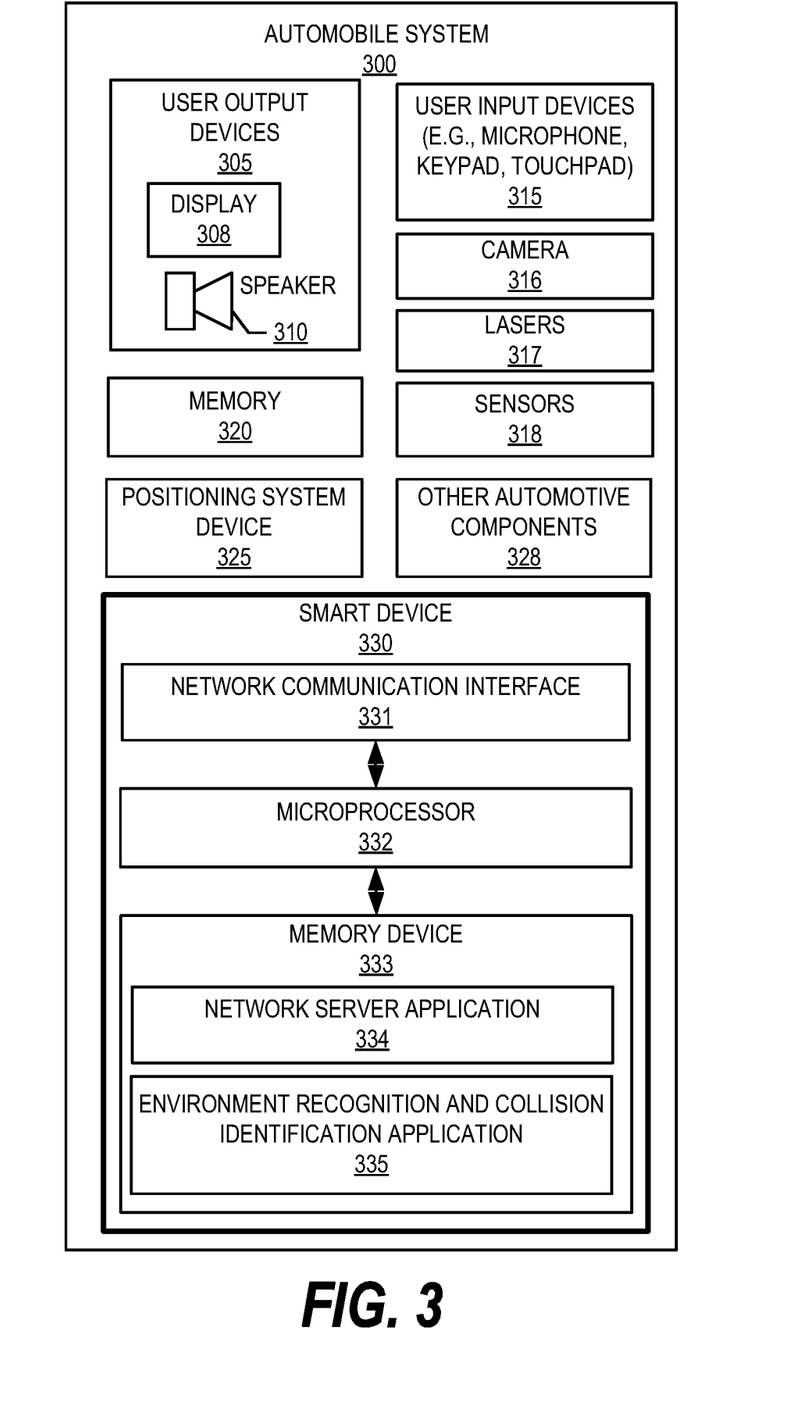
FIG. 3 presents a block diagram illustrating an automobile, in accordance with an embodiment of the present invention.

Referring now to FIG. 3, the automobile system 300 comprises one or more components of an automobile. The automobile may be any wheeled motor vehicle comprising user output devices 305, user input devices 315, memory 320, positioning system device 325, camera 316, lasers 317, sensors 318, other automotive components, and a smart device 330. In some embodiments of the present invention, the automobile 300 may be an autonomous automobile. In such an embodiment, the automobile 300 may include additional components that are required for the autonomous automobile to work effectively. In some embodiments, the automobile may be a non-autonomous automobile with additional components like camera 316, lasers 317, sensors 318, or the like to detect and monitor the environment of the automobile. In one embodiment, the camera 316 may include a backup camera. In some embodiments, the smart device 330 may be a smart chip. The smart chip may be a micro device in the automobile. In embodiments of the invention, the smart chip 330 is provided the financial institution. The smart chip 330 may be integrated into any wheeled vehicles with user input and output devices. In some embodiments, the smart chip is maintained by the financial institution. As shown in the FIG. 3, the smart chip 330 may include a network communication interface 331, microprocessor 332, and memory device 333. The microprocessor 332 is configured to use the network communication interface 331 to communicate with one or more other devices on the network 150. In this regard, the network communication interface 331 may include an antenna operatively coupled to a transmitter and a receiver (together a "transceiver"). In some embodiments, the smart chip 330 may utilize a transceiver of the automobile. The microprocessor 332 is configured to provide signals to and receive signals from the transmitter and receiver, respectively. The smart chip 330 may utilize wireless network including satellite or any other wireless network of the automobile to provide signals and receive signals. In some embodiments, the smart chip 330 may utilize a wireless network of the smart computing device 200, which may be connected to the automobile system 300, to provide signals and receive signals to perform one or more steps in the process flows described below. The smart chip 330 may be configured to raise certain triggers and alert the environment recognition and collision identification system upon occurrence on any of one or more conditions. For example, the smart chip may identify an input from a user via any of the user input devices and may alert the system. In one example, the smart chip may identify that the user has entered a destination location via the user input devices and alerts the system to trigger processes. In some embodiments, the smart chip may continuously implement the process described herein even when the automobile is not in use.

The network communication interface 331 may also include a near field communication (NFC) interface. The NFC interface may include a smart card, key card, proximity card, Bluetooth® device, radio frequency identification (RFID) tag and/or reader, transmitter, receiver, and/or the like. In some embodiments, the NFC interface communicates information via radio, infrared (IR), and/or optical transmissions. In some embodiments, the NFC interface is configured to operate as an NFC transmitter and/or as an NFC receiver (e.g., an NFC reader). Also, it will be understood that the NFC interface may be embedded, built, carried, and/or otherwise supported in and/or on the smart device 330. In some embodiments, the NFC interface is not supported in and/or on the smart device 330, but the NFC interface is otherwise operatively connected to the smart device 330. For example, the smart computing device 200 may be connected to the network communication interface 331 of the automobile system 300 and may function as the NFC interface of the automobile system 300. In some embodiments, the NFC interface of the smart device 330 is configured to contactlessly and/or wirelessly communicate information to and/or from a corresponding NFC interface of another apparatus (e.g., a point of sale (POS) device, an automated teller machine (ATM) or another mobile, remote device, third party entity devices, or computing device). In one embodiment of the present invention, the NFC interface of the smart device 330 wirelessly communicates information (virtual card information such as virtual card number, CVV code, expiration date) stored in the memory 320 of the automobile or user application 224 of the smart computing device 200 to and/or from a corresponding NFC interface of a POS device to perform an interaction.

The memory device 333 may include one or more applications or information accessed or received by the smart chip 330. The memory device, as shown, comprises one or more applications including a network server application 334, environment recognition and collision identification application 335, and/or the like. The network server application 334 may be configured to cause the microprocessor to interact with other components of the automobile, smart computing device 200, environment recognition and collision identification system 400, third party entity system 402, and/or other device associated with the network 150. The environment recognition and collision identification application may be utilized to receive and communicate information to the environment recognition and collision identification system 400 to perform one or more steps in the process flow described herein. The smart chip 330 may receive instructions from the environment recognition and collision identification system to perform one or more steps described herein. In some embodiments, the smart chip 330 may receive information from the environment recognition and collision identification system 400, the third party entity system 402 and communicate the information to the user 105 utilizing the user output devices 305 including, but not limited to, display 308 and speaker 310 of the automobile 300. In some embodiments, the smart chip 330 may receive information from the user 105 via the user input devices including, but not limited to, microphone, keypad, touchpad, and/or the like of the automobile and communicate the information received form the user to the environment recognition and collision identification system 400, the third party entity system 402 to perform one or more steps in the process flows described herein. In some embodiments of the present invention, the smart chip 330 may identify current location of the automobile utilizing the positioning system device 325 of the automobile. In some other embodiments, the smart chip 330 may utilize other automotive components 328 or information available in the other automotive components 328 of the automobile. The automotive components, may include any body and main parts, electrical and electronics (including navigation system, gauges and meters, sensors, electrical switches, cameras, audio/video devices, and/or the like), interior components (car seats, floor components, and/or the like), power train and chassis, and/or the like. In some embodiments, the automobile further comprises a chip reader to facilitate completion of one or more interactions. In some embodiments, the system comprises any other built in mechanism to facilitate completion of one or more interactions. In some embodiments, the built in mechanism and the chip reader may be provided by a financial institution. All or some components of the automobile described above may be considered as an automobile system.

Figure 4:
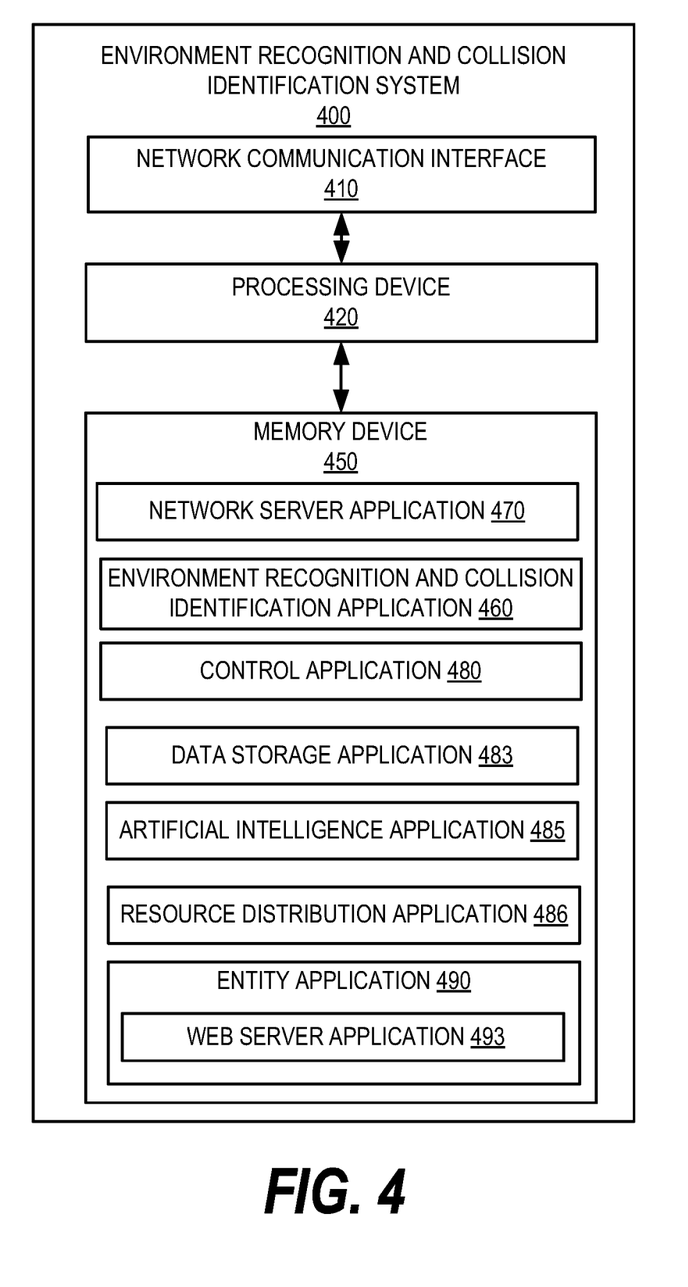
FIG. 4 presents a block diagram illustrating an environment recognition and collision identification system, in accordance with an embodiment of the present invention.

FIG. 4 provides a block diagram illustrating the environment recognition and collision identification system 400, in greater detail, in accordance with embodiments of the invention. As illustrated in FIG. 4, in one embodiment of the invention, the environment recognition and collision identification system 400 includes one or more processing devices 420 operatively coupled to a network communication interface 410 and a memory device 450. In certain embodiments, the environment recognition and collision identification system 400 is operated by a financial institution, although the environment recognition and collision identification system 400 may be operated by another entity. In some embodiments, the environment recognition and collision identification system 400 is part of a system of the automobile system 300, wherein the environment recognition and collision identification system 400 may be embedded within any component of the automobile. In some embodiments of the invention, the environment recognition and collision identification system 400 is part of the smart chip 330, wherein the smart chip 330 is placed in the automobile and is a part of the automobile. In such an embodiment, the system establishes a direct communication link with the automobile system. In some embodiments, the environment recognition and collision identification system 400 may be an independent system, wherein the environment recognition and collision identification system 400 communicates with the automobile to performs one or more actions described in the process flows below via the smart chip 330 of the automobile. In such an embodiment, the system 400 establishes a communication link with the automobile system via the smart chip. For example, the system 400 may communicate with user input devices 315, positioning device 325, other automotive components 328, and user output devices 305 via the smart chip 330. In such embodiments, the system 400 may connect with the smart computing device 200 of the user via the smart chip 330, wherein the smart computing device 200 is present with the user and wherein the smart computing device 200 may be connected with the automobile system 300. In some embodiments, the smart computing device 200 may not be connected with the automobile system 300 via wired or wireless technology.

In one embodiment, the environment recognition and collision identification system 400 is part of a financial institution system. In such an embodiment, a resource distribution application performing the operations of the environment recognition and collision identification system 400 is stored in the entity system. In such embodiments, the smart chip may be configured to perform one or more steps of the process flows described herein and the environment recognition and collision identification system monitors and controls the smart chip and provides any additional information required to perform the one or more steps. In some embodiments, the environment recognition and collision identification system 400 may be a part of the smart chip 330 in the automobile.

It should be understood that the memory device 450 may include one or more applications and one or more databases or other data structures/repositories. The memory device 450 also includes computer-executable program code that instructs the processing device 420 to operate the network communication interface 410 to perform certain communication functions of the environment recognition and collision identification system 400 described herein. For example, in one embodiment of the environment recognition and collision identification system 400, the memory device 450 includes, but is not limited to, a network server application 470, an environment recognition and collision identification application 470, control application 480, a data storage application 483, artificial intelligence engine application 485, resource distribution application 486, and other computer-executable instructions or other data. The computer-executable program code of the network server application 470, the environment recognition and collision identification application 470, the control application 480, and the data storage application 483, artificial intelligence engine application 485, and resource distribution application 486 may instruct the processing device 420 to perform certain logic, data-processing, and data-storing functions of the environment recognition and collision identification system 400 described herein, as well as communication functions of the environment recognition and collision identification system 400. In some embodiments, the memory device 450 may comprise a rules engine which may be used by the artificial intelligence engine to perform one or more steps of the process flow described herein.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as computing device 200. The processing device 420 is configured to use the network communication interface 410 to transmit and/or receive data and/or commands to and/or from the other devices connected to the network 150. The environment recognition and collision identification system 400, communicates with the smart chip 330 of the automobile to perform various steps described herein. The environment recognition and collision identification system 400, communicates with third party entity system 402 to perform various steps described herein. In some embodiments, the environment recognition and collision identification system 400, communicates with other systems such as traffic monitoring system, entity system, authorization systems, and/or the like. The environment recognition and collision identification system 400 also comprises an artificial intelligence engine.

Figure 5A:
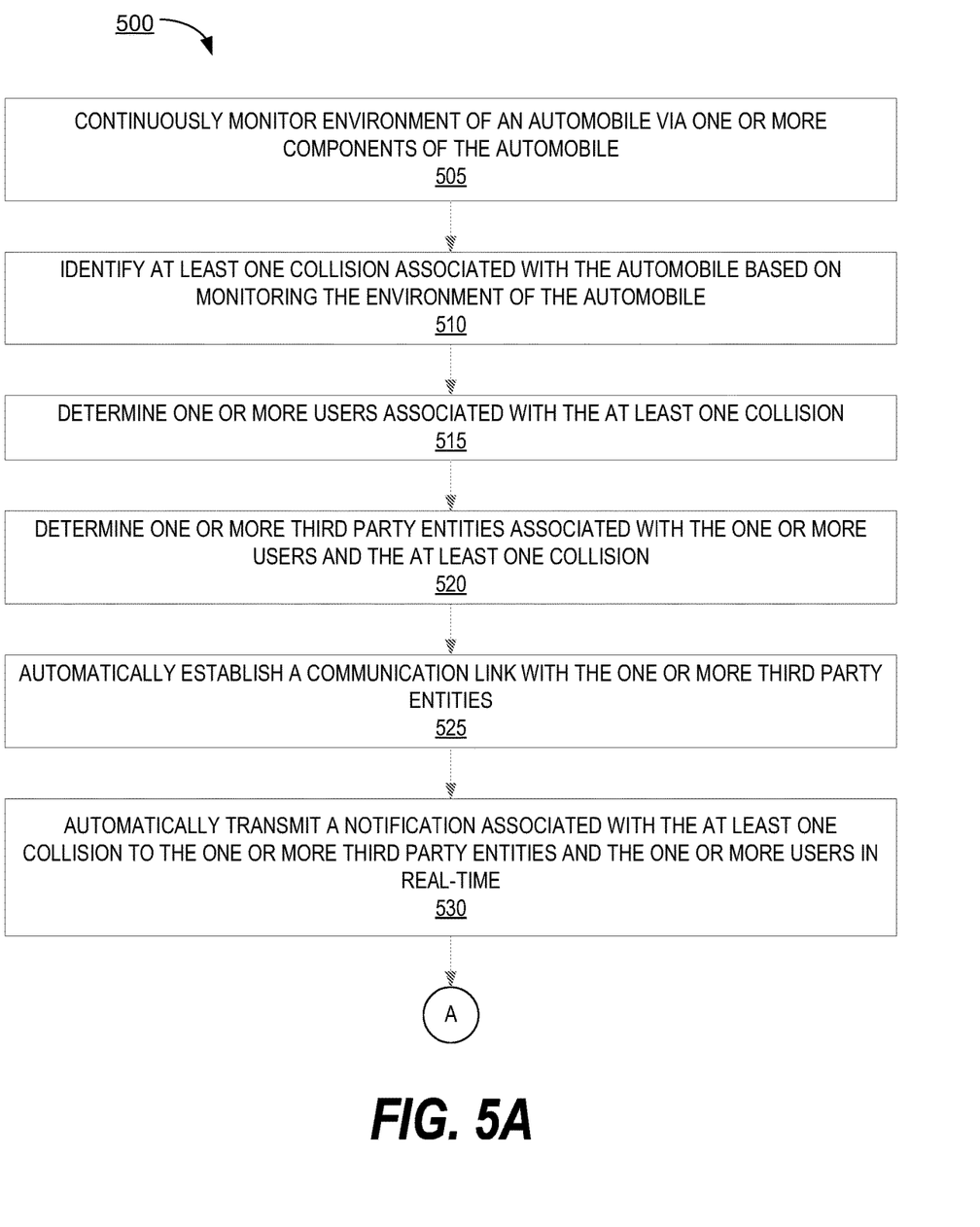
FIG. 5A presents a process flow for recognizing vehicle environment and identifying at least one collision, in accordance with an embodiment of the present invention.
Figure 5B:
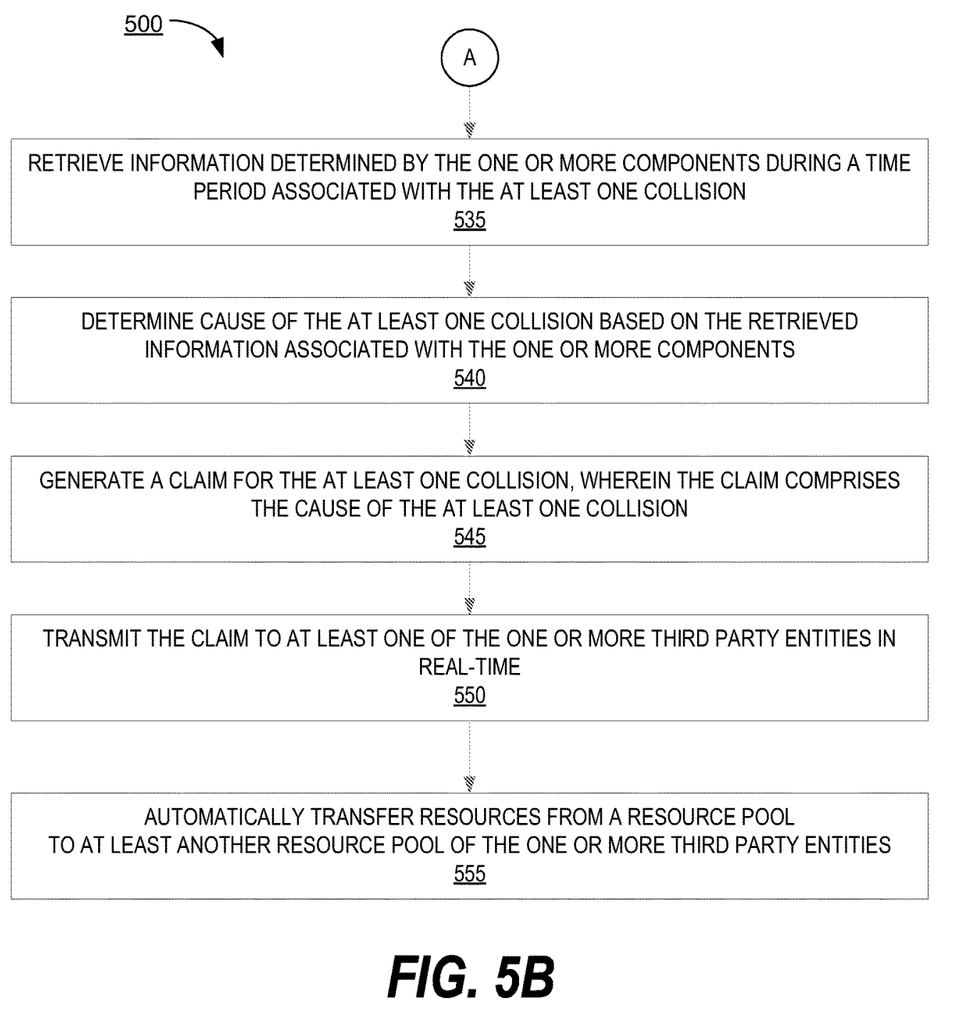
FIG. 5B presents a continuation of process flow for recognizing vehicle environment and identifying at least one collision, in accordance with an embodiment of the present invention.

Referring now to FIG. 5A and FIG. 5B, the process flow 500 illustrates a process flow 500 for recognizing vehicle environment and identifying collisions. The system performs the process illustrated in FIG. 5A and FIG. 5B when the acceleration of the automobile is greater than or equal to zero. As shown in block 505, the system continuously monitors environment of an automobile via one or more components of the automobile. The system monitors the environment of the automobile by accessing the camera, the lasers, the sensors, other automotive components including gauges meters, sensors, for the like located on the automobile 300. In some embodiments, the system may identify or track the path of the automobile. The system also stores the information associated with the camera, the lasers, the sensors, the other automotive components, or the like in the memory of the automobile. In some embodiments, the system may automatically erase the stored information after a predetermined amount of time. For example, the system may erase the stored information for every twenty four hours. In some embodiments, the system may erase only insignificant information from the memory. For example, if the system identifies a collision within the twenty four hour period, the system retains the data associated with the collision and erases other insignificant information.

As shown in block 510, the system identifies at least one collision associated with the automobile based on monitoring the environment of the automobile. The system identifies collisions based on the information accessed from the camera, the lasers, the sensors, the other automotive components. In some embodiments, the system may include a collision detection modules comprising instructions and set of rules to recognize the at least one collision. In some embodiments, the collision detection module may be present in the automobile and the system receives an input associated with a collision from the collision detection module located in the automobile. In some embodiments, the system in response to identifying the at least one collision, controls at least one of the one or more components of the automobile. For example, the system in response to identifying the at least one collision, automatically activates hazard lights of the vehicle.

As shown in block 515, the system determines one or more users associated with the at least one collision. The system determines the one or more users associated with the at least one collision based on the information captured by the camera or similar components of the automobile. For example, the camera of the automobile may capture a registration plate of an automobile involved in the at least one collision. The system may use optical character recognition technology to identify characters and numbers on the registration plate. In some embodiments, the system may include an optical character recognition module to identify the characters and numbers on the registration plate. The system may then utilize the identified characters and numbers of the registration plate to identify the one or more users associated with the at least one collision. For example, the system may communicate with other systems to identify the one or more users associated with the registration plate of the automobile involved in the at least one collision.

As shown in block 520, the system determines one or more third party entities associated with the one or more users and the at least one collision. The one or more third party entities may be emergency responders, authorities, insurance agencies, or the like. The system may identify the one or more third party entities based on a category of the at least one collision, The system determines the category of the collision based on the speed, level of damage, or the like associated with all vehicles involved in the at least one collision. The speed, level of damage may be captured by components such as the camera, the sensors, the lasers, and/or the like of the automobile. For example, the system may identify that the speed of one automobile is zero, the speed of at least one other automobile involved in the at least one collision is less than ten miles per hour, and that the level of damage is very low such as a fender bender. In such a case the system may notify authorities and insurance agencies but not the emergency responders. As shown in block 525, the system in response to determining the one or more third party entities automatically establishes a communication link with the one or more third party entities. As shown in block 530, the system automatically transmits a notification associated with the at least one collision to the one or more third party entities and the one or more users in real-time. For example, the system transmits notification to user of the automobile, second user of another automobile, emergency responders, authorities, and insurance companies of the user and the second user. In some embodiments, the system may transfer the information captured by the components of the automobile during the time of the at least one collision.

As shown in block 535, the system retrieves information determined by the one or more components during a time period associated with the at least one collision. The system retrieves the information captured by the one or more components of the automobile during a time period associated with the at least one collision. The system may perform one or more steps described in blocks 535 through 555 while notifying the one or more third party entities. As such, the system may perform parallel processing to improve the efficiency of the process.

As shown in block 540, the system determines cause of the at least one collision based on the retrieved information associated with the one or more components. The system in response to notifying the one or more third party entities identifies the cause of the at least one collision. The system based on the information captured by the camera, the sensors, the lasers, and the other automotive components in the automobile determines the cause of the at least one collision. For example, the system identifies that the at least one collision is a rear-end collision and identifies that a second user of another automobile is the cause of the at least one collision based on the speeds of the automobile and another automobile. In another example, the system identifies that the at least one collision is a rear-end backing up collision and identifies that the user of the automobile is the cause of the at least one collision. In such an example, the system identifies that the speed of another automobile is zero, the speed of the automobile is not zero, and the gear of the automobile is reverse and determines that the cause of the at least one collision is the user of the automobile. In one embodiments, the system, along with the information from the one or more components defined above, may utilize GPS location of the automobile to determine the cause of the at least one collision. For example, the collision may have occurred at an intersection. The system based on the information from the one or more components and the GPS location of the automobile, performs calculations associated with distance and time to identify the cause of the collision. In some embodiments, the system based on the GPS location of the automobile, identifies a state in which the collision has occurred and determines the cause of the collision based on associated state laws. In some embodiments, the system considers driving history of the one or more users involved in the at least one collision. For example, the system may identify that a second user involved in the at least one collision is a negligent driver and may perform computations based on identifying that the second user is a negligent driver to identify the cause of the at least one collision.

As shown in block 545, the system generates a claim for the at least one collision, wherein the claims comprises the cause of the at least one collision. For example, the system automatically generates an insurance claim. The system may also estimate the damages based on the information captured by the components of the automobile. As shown in block 550, the system transmits the claim to at least one of the one or more third party entities in real-time. The system transmits the claim to all the insurance companies associated with the users involved in the at least one collision. In some embodiments, in addition to transmitting the claim, the system may also communicate with third party systems to extract a police report associated with the at least one collision and may transmit the police report to all the insurance companies associated with the user involved in the at least one collision.

As shown in block 555, the system automatically transfers resources from a resource pool. In one embodiment, the system identifies that the cause of the at least one collision is the user of the automobile and transfers resources associated with the claim. The system transfers the resources from a resource pool of the user, wherein the resource pool information may be extracted from the user device of the user connected to the automobile. The resource distribution application in the system communicates with resource distribution application, the entity application, and the authorization application in the smart computing device of user device of the user to initiate and complete the transfer of resources. The system may directly transfer the resources to a resource pool of the second user of another automobile involved in the at least one collision. In one example, the system may use NFC interface of the smart chip to directly transfer resources to a smart chip in another automobile. In another example, the system may transfer resources may use NFC interface of the smart chip to directly transfer resources to a second user device of the second user. In another example, the system may transfer resources may use cause the smart computing device of the user to directly transfer resources to a second user device of the second user. In another example, the system may transfer resources from the resource pool of the user to a resource pool of an insurance company associated with the second user via the smart chip or the user computing device.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for vehicle environment recognition and collision identification, the system comprising:
   one or more memory devices having computer readable code stored thereon;
   one or more processing devices operatively coupled to the one or more memory devices, wherein the one or more processing devices are configured to execute the computer readable code to:
   continuously monitor environment of an automobile via one or more components of the automobile and a smart chip located in the automobile;
   identify at least one collision associated with the automobile based on monitoring the environment of the automobile;
   determine one or more users associated with the at least one collision, wherein the one or more users comprise a first user of the automobile and a second user of a second automobile;
   determine a category of the at least one collision based on information gathered by the one or more components;
   determine one or more third party entities associated with the one or more users and the at least one collision based on the category of the at least one collision;
   automatically establish a communication link with the one or more third party entities;
   automatically transmit a notification associated with the at least one collision to the one or more third party entities and the one or more users in real-time;
   determine that the first user associated with the automobile is cause of the at least one collision based on the information gathered by the one or more components; and
   in response to determining that the first user is the cause of the at least one collision, initiate transfer of resources, via the smart chip, from a resource pool of the first user to a second smart chip in the second automobile.

2. The system of claim 1, wherein the one or more processing devices are configured to execute the computer readable code to continuously store the information gathered by the one or more components of the automobile.

3. The system of claim 2, wherein the one or more processing devices are configured to execute the computer readable code to:
   in response to identifying the at least one collision, retrieve the information gathered by the one or more components during a time period associated with the at least one collision;
   generate a claim for the at least one collision, wherein the claim comprises the cause of the at least one collision; and
   transmit the claim to at least one of the one or more third party entities in real-time.

4. The system of claim 1, wherein the one or more components comprise at least one of one or more sensors, one or more lasers, one or more cameras, and speed monitoring systems.

5. The system of claim 1, wherein the one or more processing devices are configured to execute the computer readable code to identify the at least one collision when acceleration of the automobile is greater than zero.

6. The system of claim 1, wherein the one or more processing devices are configured to execute the computer readable code to identify the at least one collision when acceleration of the automobile is equal to zero.

7. The system of claim 1, wherein the automobile is an autonomous automobile.

8. The system of claim 1, wherein the one or more third party entities comprise at least one of authorities, emergency responders, and insurance entities.

9. The system of claim 1, wherein the one or more processing devices are configured to execute the computer readable code to:
   in response to determining the at least one collision, automatically control at least one of the one or more components of the automobile.

10. A computer program product for vehicle environment recognition and collision identification, the computer program product comprising a non-transitory computer-readable storage medium having computer-executable instructions for causing a computer processor to perform the steps of:

continuously monitoring environment of an automobile via one or more components of the automobile;

identifying at least one collision associated with the automobile based on monitoring the environment of the automobile and a smart chip located in the automobile;

determining one or more users associated with the at least one collision, wherein the one or more users comprise a first user of the automobile and a second user of a second automobile;

determining a category of the at least one collision based on information gathered by the one or more components;

determining one or more third party entities associated with the one or more users and the at least one collision based on the category of the at least one collision;

automatically establishing a communication link with the one or more third party entities;

automatically transmitting a notification associated with the at least one collision to the one or more third party entities and the one or more users in real-time;

determining that the first user associated with the automobile is cause of the at least one collision based on the information gathered by the one or more components; and in response to determining that the first user is the cause of the at least one collision, initiating transfer of resources, via the smart chip, from a resource pool of the first user to a second smart chip in the second automobile.

11. The computer program product of claim 10, wherein the computer readable instructions further cause the computer processor to perform the steps of continuously storing the information gathered by the one or more components of the automobile.

12. The computer program product of claim 11, wherein the computer readable instructions further cause the computer processor to perform the steps of:

in response to identifying the at least one collision, retrieving the information gathered by the one or more components during a time period associated with the at least one collision;

generating a claim for the at least one collision, wherein the claim comprises the cause of the at least one collision; and transmitting the claim to at least one of the one or more third party entities in real-time.

13. The computer program product of claim 10, wherein the computer readable instructions further cause the computer processor to perform the step of in response to determining the at least one collision, automatically controlling at least one of the one or more components of the automobile.

14. A computerized method of recognizing vehicle environment and identifying collisions, comprising:

continuously monitoring environment of an automobile via one or more components of the automobile and a smart chip located in the automobile;

identifying at least one collision associated with the automobile based on monitoring the environment of the automobile;

determining one or more users associated with the at least one collision, wherein the one or more users comprise a first user of the automobile and a second user of a second automobile;

determining a category of the at least one collision based on information gathered by the one or more components;

determining one or more third party entities associated with the one or more users and the at least one collision based on the category of the at least one collision;

automatically establishing a communication link with the one or more third party entities;

automatically transmitting a notification associated with the at least one collision to the one or more third party entities and the one or more users in real-time;

determine that the first user associated with the automobile is cause of the at least one collision based on the information gathered by the one or more components; and in response to determining that the first user is the cause of the at least one collision, initiate transfer of resources, via the smart chip, from a resource pool of the first user to a second smart chip in the second automobile.

15. The computerized method of claim 14, wherein the method comprises continuously storing the information gathered by the one or more components of the automobile.

16. The computerized method of claim 15, wherein the method comprises:

in response to identifying the at least one collision, retrieving the information gathered by the one or more components during a time period associated with the at least one collision;

generating a claim for the at least one collision, wherein the claim comprises the cause of the at least one collision; and transmitting the claim to at least one of the one or more third party entities in real-time.

17. The computerized method of claim 14, wherein the method comprises in response to determining the at least one collision, automatically controlling at least one of the one or more components of the automobile.

18. The computer program product of claim 10, wherein the automobile is an autonomous automobile.

19. The computerized method of claim 14, wherein the automobile is an autonomous automobile.

20. The computerized method of claim 14, wherein the one or more third party entities comprise at least one of authorities, emergency responders, and insurance entities.

* * * * *